United States Patent [19]
Prince

[11] Patent Number: 5,535,854
[45] Date of Patent: Jul. 16, 1996

[54] BRAKE LINING WEAR INDICATOR GAUGE

[76] Inventor: Robert J. Prince, #278-52435 R.R. 223 Sherwood Park, Alberta, Canada, T8A-4P8

[21] Appl. No.: 877,959

[22] Filed: Apr. 27, 1992

[51] Int. Cl.⁶ .................................................. F16D 66/02
[52] U.S. Cl. ........................................ 188/1.11; 188/79.55
[58] Field of Search ........................... 188/1.11, 79.55; 74/522; 73/129

[56] References Cited

U.S. PATENT DOCUMENTS

| | | | |
|---|---|---|---|
| 2,379,796 | 10/1942 | Freeman et al. | 188/79.55 |
| 3,008,344 | 11/1961 | Dracka | 74/522 |
| 3,339,676 | 9/1967 | Quinn | 188/1.11 |
| 3,356,188 | 12/1967 | Goldman et al. | 188/1.11 |

FOREIGN PATENT DOCUMENTS 1551663  12/1968  France ................................ 188/1.11

Primary Examiner—Robert J. Oberleitner
Assistant Examiner—Chris Schwartz
Attorney, Agent, or Firm—Caesar, Rivise, Bernstein, Cohen & Pokotilow, Ltd.

[57] ABSTRACT

This invention relates to a one piece brake lining wear indicator that is a reversible circular dial. Calibration marks are included on both sides of the circular dial along with several accentuating notches on the outside circumference of the dial. When the dial is coupled to the splined end of a rotatable brake shoe camshaft that is equipped with manual or automatic slack adjusting levers, the dial acts as an indicator of the amount of brake lining wear that occurs inside the brake drum compartment.

9 Claims, 5 Drawing Sheets

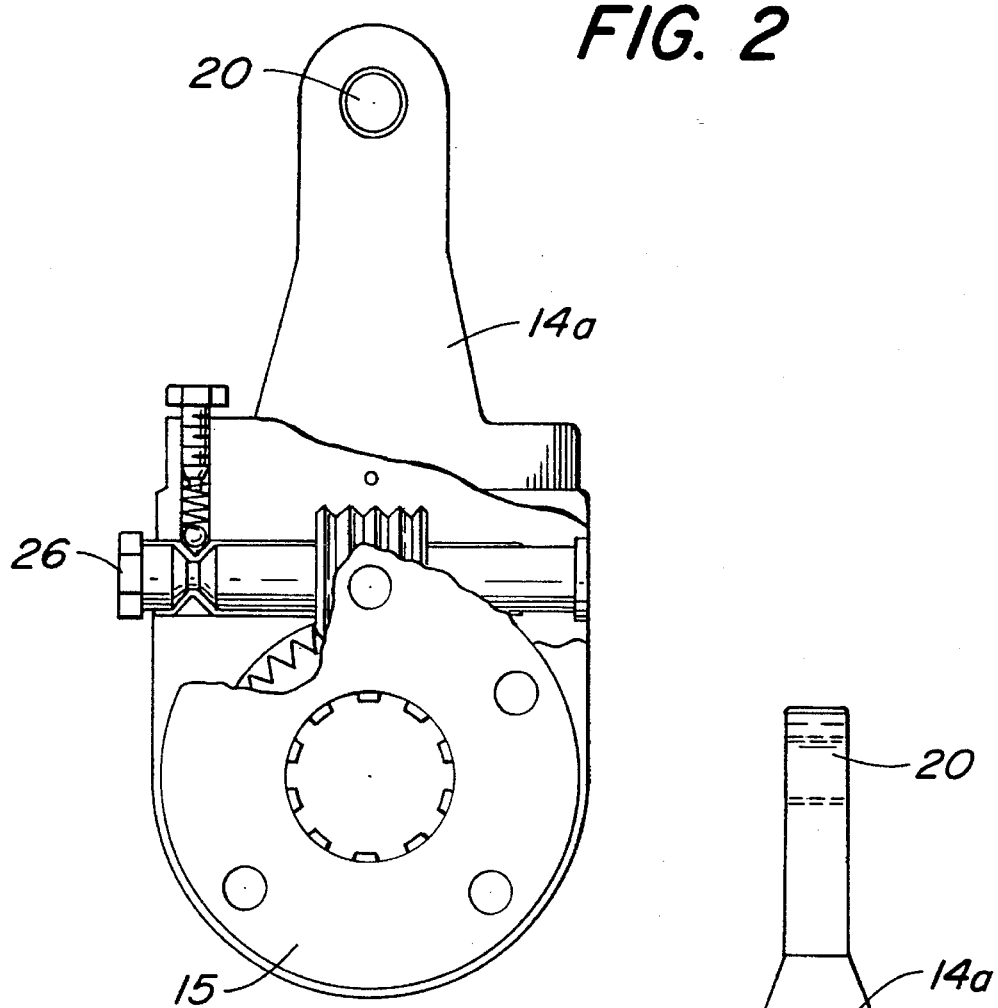
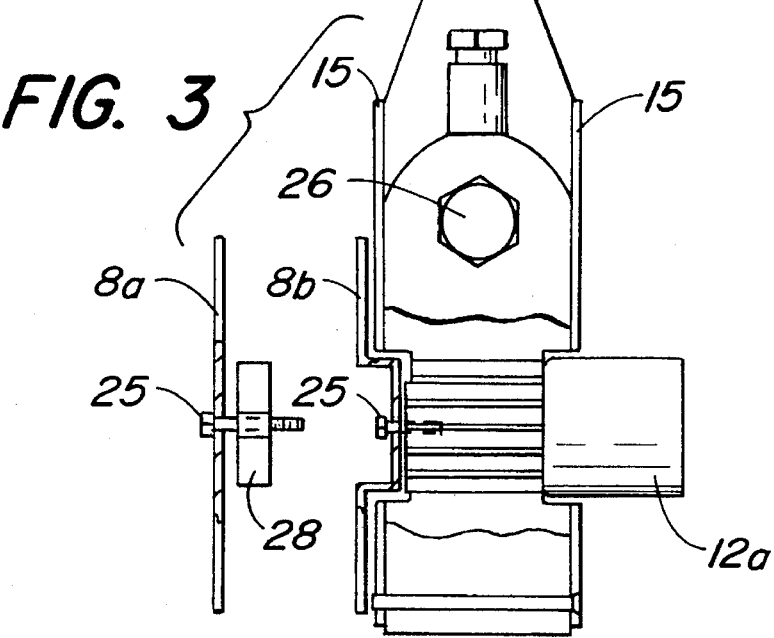

BRAKE LINING WEAR INDICATOR GAUGE

BACKGROUND OF INVENTION

This invention relates to mechanical indicators, more particularly to mechanical gauges used on vehicles to indicate brake lining wear.

In vehicle braking mechanisms of the type using a cam positioned between two brake shoes and activated by a rotatable camshaft, it is common practice to accomplish movement of the cam by attaching to the cam a motor driven actuating lever. Because of the stroke limitations of the engine activating the lever rotating the brake cam a compensating device was built into the lever to make up for the brake lining wear taking place inside the brake drum compartment. These types of levers are known as slack adjusting levers, which can be manually or automatically adjusted. As the brake lining wears out inside the brake drum compartment a compensating adjustment is made on the slack adjusting lever outside the brake drum compartment. The method of compensating adjustment is done by rotating the brake camshaft inside the hub of the slack adjusting lever. The accumulated amount of rotational adjustments made inside the hub of the slack adjusting lever causing a differential between the cam and the lever becomes a source for accumulating brake lining wear data.

When brake linings wear out, compensating adjustments becomes essential in order to minimize the amount of travel the adjustable lever needs to travel in order to apply the brakes. The purpose of the wear indicator dial gauge is to disclose the amount of compensating adjustment that has taken place during each of the slack adjustments, this is done by comparing the calibration marks on the brake lining wear indicator gauge with the alignment mark 18 on original equipment slack adjusters or by virtue of a straight edge ruler forming an axial center line starting from the center of the clevis pin hole 20 on the slack adjusting lever to the machined centering hole on the splined end of the rotating camshaft axially mounted in the hub of the lever.

The standard procedure used by the industry for checking the amount of brake lining wear taking place inside a brake drum compartment is done by removing a brake drum, by removing an inspection cover at the rear of the brake drum compartment or by peeking through a specially positioned inspection hole in order to get a visual assessment of the amount of brake lining wear.

It has been proposed to make this brake lining wear information externally visible in the form of a register in order to assist the brake service mechanic and the operator of the vehicle in assessing the condition of brake linings inside a brake drum compartment without having to remove a wheel to get the same information.

By connecting the brake lining wear indicator to the axle of the brake camshaft every time the brake camshaft rotates inside the hub of the slack adjusting lever when brake adjustments are made to the brakes on a vehicle so simultaneously the brake lining wear indicator gauge rotates with the brake camshaft. The brake lining wear indicator gauge remains constantly fixed on the end of the brake camshaft as a visual register and an external reminder of the amount of adjustment travel that has taken place since the beginning of the brake adjusting cycle.

The proposed mechanisms for recording brake lining wear prior to this invention have not been without some difficulties and some modifications to the existing brake mechanisms. In the case of one prior device having two co-acting members namely a stator and a rotor also called an index and a co-acting dial plate, this system proved to be mechanically uneconomical because of having to adapt to the variation in size and styles of slack adjusting levers of the manual and automatic kind, difficulty was encountered with the attaching tabs of the co-acting parts to the brake mechanism.

Other problems encountered with prior dual component co-acting brake lining wear gauges was the indicator tabs protruding from the face of the dial, these few protruding tabs being exposed to the road hazards on gravel roads were continually getting bent giving the brake service mechanic and the vehicle operator a distorted reading of the brake lining wear.

OBJECTS OF THE INVENTION

Accordingly, it is the general object of this invention to provide apparatus which address the aformentioned needs.

It is another object of this invention to provide a brake lining wear indicator gauge which does not require costly modifications to the brake control mechanisms.

It is yet a further object of this invention to provide a brake lining wear indicator that can be installed on braking systems already in service.

It is still yet another object of this invention to provide a brake lining wear indicator that can replace the existing spacer washer that is presently used with the installation of slack adjustable levers on the spline end of brake camshafts.

SUMMARY OF THE INVENTION

These and other objects of the instant invention are achieved by providing a brake lining wear indicator gauge to be coupled to a brake camshaft of a brake adjusting mechanism wherein the camshaft has an end and is coupled to a slack adjustment lever having a cover plate. The camshaft end, the slack adjustment lever and the cover plate have respective alignment reference points. The gauge comprises a first side and a second side sharing a common outer periphery and a common central aperture for coupling the gauge to the camshaft end. The gauge indicates brake lining wear to a person without the use of a separate cooperating plate once the gauge is coupled to the camshaft end. The outer periphery is circular and has two adjacent notches forming a start-cycle pointer therein to be aligned with one of the respective alignment reference points at the start of the brake lining wear cycle. The outer periphery also has a third notch and a fourth notch therein. The first side has calibrations indicated by numerals and lines adjacent the outer periphery between the start-cycle pointer and the third notch and between the start-cycle pointer and the fourth notch. The numerals appear in descending order from the start-cycle pointer to the third notch and from the start-cycle pointer to the fourth notch. The numerals and lines correspond to the amount of brake lining wear.

BRIEF DESCRIPTION OF THE DRAWINGS

FIG. 2 is a cut-away view of a slack adjusting lever used in a short camshaft.

FIG. 3 is a side view of the slack adjusting lever of FIG. 2;

DETAILED DESCRIPTION OF THE INVENTION

Figure 1:
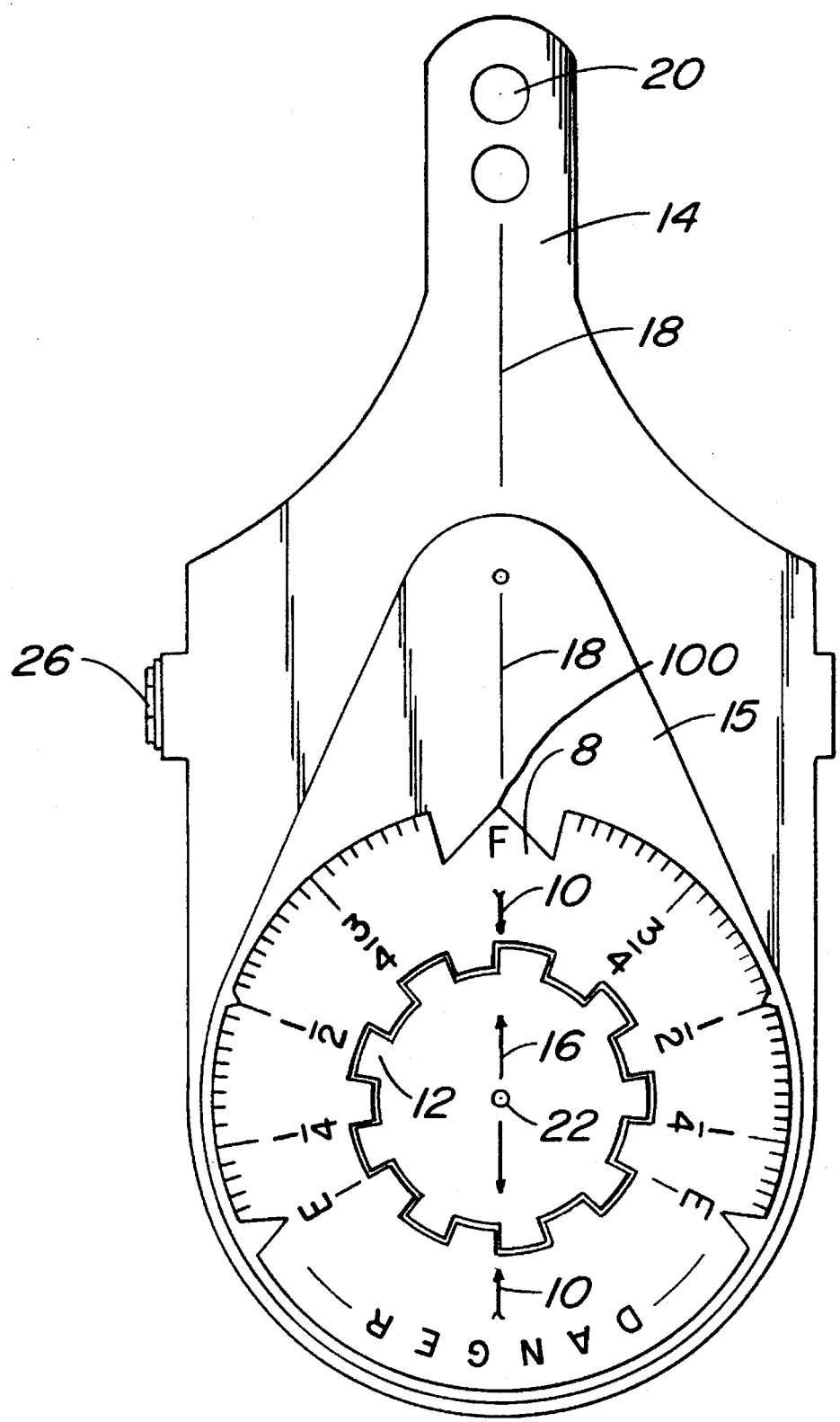
FIG. 1 is a front view of the invention coupled to the splined end of a brake camshaft.

The brake lining wear indicator gauge is reversible, circular and has a dial face having a register with calibration marks on both sides of the flat surfaces of the dial. The brake lining wear indicator gauge has several pre-positioned notches cut in the outside circumference of the dial gauge. The timing mark 16 on the brake camshaft 12 and the timing mark 10 on the brake lining wear indicator gauge 8 as illustrated in FIG. 1 of the drawings are used for timing the dial gauge to the brake camshaft on first time installations of the brake lining wear indicator. The alignment line 18 on the cover plate 15 and the alignment line 18 on the slack adjustable lever 14 becomes one of the several means used to interpret the information stored on the register of the brake lining wear indicator gauge thereby disclosing the amount of brake lining wear that has taken place on the brake shoes inside a brake drum compartment.

A calibration marked F and a start-cycle pointer 100 formed by two adjacent notches on the face of the dial gauge 8 aligned to the alignment line 18 on a slack adjusting lever 14 as shown in FIG. 1 is used to indicate the starting point of the brake lining wear cycle and signifies that brake shoes with the full amount of brake linings were installed on the vehicle or that the slack adjusting lever has been backed off and reset to the starting position of the brake adjusting cycle. The two calibration marks E accentuated with notches on the outside circumference of the wear indicator gauge 8 respectively signify the end of the brake lining wear cycle. All the notches on the outside circumference of the dial gauge are used to accentuate calibration marks on the face of the dial gauge and serve as delimiters to facilitate the reading of the dial gauge in visually adverse climatic conditions. The circumference of the hole in the center of the brake lining wear indicator gauge 8 has a series of machined grooves which are able to mate with the various size brake camshafts and grooved patterns machined on the spline end of brake camshafts. The present invention has eliminated the need of having to install two or more co-acting parts to make the gauge functional as will be further explained in the disclosure. By synchronizing the brake lining wear indicator gauge to the brake camshaft at the beginning of the brake camshaft rotating cycle and then connecting the brake lining wear indicator gauge to the axle of the brake camshaft the entire amount of brake lining wear taking place inside the brake drum compartment can be interpreted from the pre-recorded data on the register of the dial gauge, making the embodiment of this invention a one piece brake lining wear indicator gauge. The advantages of a one piece brake lining wear indicator gauge is the simplicity of installation on braking systems using rotating camshafts equipped with slack adjusting levers, the absence of gauge malfunction, the practicality of packaging and manufacturing, making this brake safety device another means of visually monitoring brake lining wear during roadside safety checks. Extracting the pre-recorded brake lining wear information from the brake lining wear indicator gauge is done in the first instance by means of mating the alignment marks 18 on the slack adjusting lever to the calibrations marked on the dial gauge. The pre-stored brake lining wear information may also be extracted from the brake lining wear indicator gauge by using a straight edge ruler and with it form an axial straight line from the center of the hole 20 used by the clevis pin to the machined centering hole on splined end of the brake camshaft. Where the axial line intersects the calibration marks on the face of the dial gauge is the position from which the brake lining wear is calculated.

The calibration marks on both sides of the flat surfaces of the brake lining wear indicator dial gauge serve the useful purpose of being able to reverse the dial gauge mounted on the end of the brake camshaft for the added feature of fine tuning and aligning the F indication mark on the face of the dial gauge to the axial center of the slack adjusting lever or the alignment line 18 on the slack adjusting lever 14.

Figure 4:
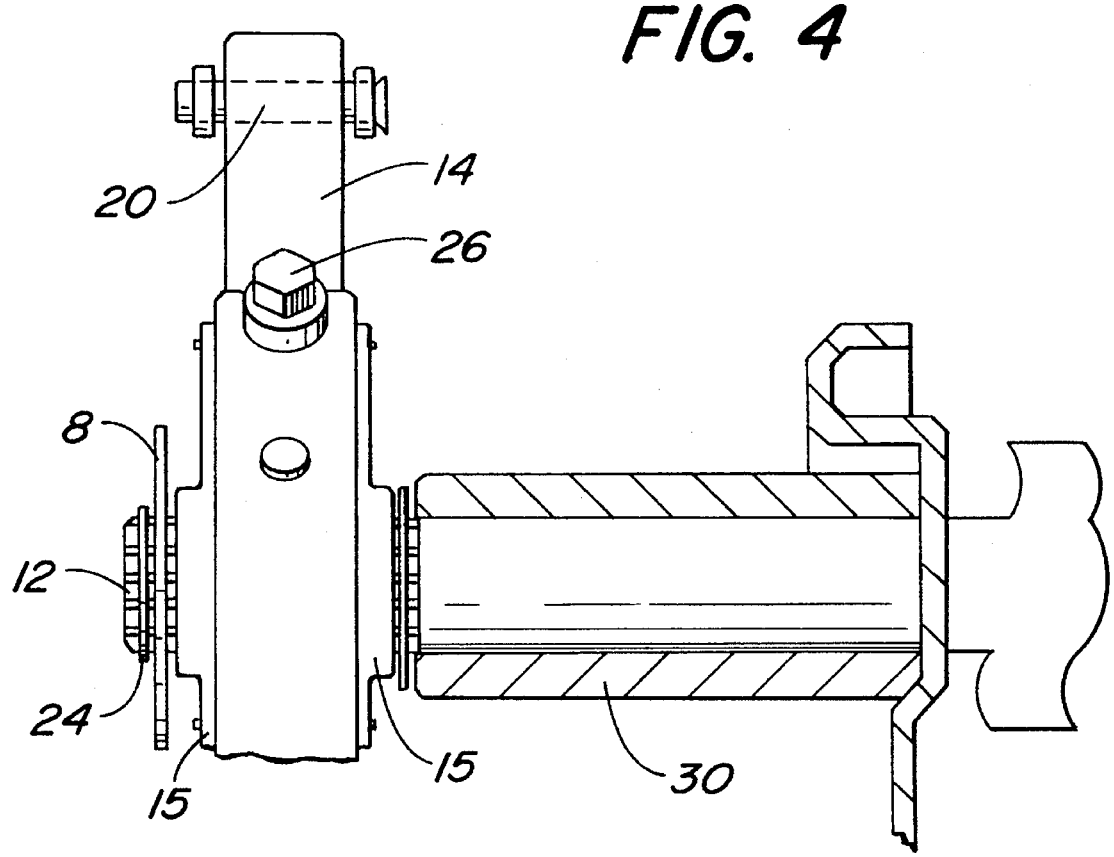
FIG. 4 is a cross-sectional view of the brake camshaft and the invention mounted on the camshaft.

The grooves machined on the perimeter of the hole in the center of the brake lining wear indicator gauge 8 are machined in such a way so that when the brake lining wear indicator gauge is reversed round on the end of the brake camshaft the calibration mark F on the face of the dial gauge has changed its alignment position, the motive for reversing the gauge. The brake lining wear indicator gauge is meant to replace the existing spacer washer that is presently used between the slack adjuster cover plate 15 and the snap ring 24 that is used to retain the washer as illustrated in FIG. 4.

The grooves machined on the perimeter of the hole in the center of the brake lining wear indicator gauge 8 are machined a few degrees out of alignment with the F indicator mark (and the start-cycle pointer 100) on the face of the dial gauge so that when the gauge is reversed on the end of the brake camshaft, the F indicator mark (and the start-cycle pointer 100) is moved off of alignment center a few degrees from the alignment line 18 on the slack adjusting lever 14. This feature is built-in to compensate for the installation of new oversize brake linings of different. An example of this out of alignment of a few degrees can clearly be seen in FIG. 6a. The start-cycle pointer 100 is aligned with one sidewall 102 of the top groove 104, rather than pointer 100 being centered over the top groove 104. An other novel feature incorporated in this invention is the numerical calibrations' descending values marked from left to right and from right to left on the face of the dial gauge. This is especially useful when installing the gauge on brake adjusting mechanisms that are left handed or right hand mounted on either side of any vehicle, the calibrations on the face of the gauge can read from left to right as well as from right to left.

When new brake linings are installed on a vehicle or partially worn out brake linings that are already in service on a vehicle, where no timing marks exist on brake camshafts and where there are no alignment marks on the slack adjusting lever the method of timing and installing the brake lining wear indicator gauge to the brake camshaft is as follows: Reverse the slack adjustment screw 26 on the slack adjuster 14 until the rotating brake camshaft has returned to the beginning of the brake wear adjustment cycle. Remove the snap ring 24 and the existing spacer washer then install the brake lining wear indicator gauge 8 over the splined end of the brake camshaft making sure the calibration marked F on the face of the brake lining wear indicator gauge is lined up with the center of the brake adjusting lever. The center of the brake adjusting lever is found by using a straight edge ruler to form an axial alignment line starting from the center of the clevis pin hole 20 at the top end of the slack adjusting lever to the machined centering hole 22 in the splined end of the brake camshaft that is axially mounted in the hub of the slack adjusting lever.

The brake lining wear indicator gauge connected to the splined end of the brake camshaft was invented to give the brake inspection service mechanic and the roadside brake safety inspector a visual indication of the amount of brake lining wear that has taken place inside the brake drum compartment after the new brake linings were installed without having to remove the brake drum or inspection covers thereby speeding up a brake inspection safety check.

An added safety benefit achieved by connecting a large dial gauge to the end of brake camshafts, is that the apprentice mechanic adjusting the vehicle's brakes can get a visual warning when he is turning the brake adjustment screw the wrong way. By watching the direction of the rotation of a large dial gauge indicated by the descending numerical value of the calibrations marked on the face of the dial gauge the apprentice mechanic is warned that he is adjusting the brakes the wrong way, he could be backing off the brakes instead of adjusting them, a mistake too often made.

The metering cycle for the brake lining wear indicator gauge begins with the installation of new brake linings on a vehicle. When new brake linings are installed on a vehicle the brake lever slack adjusting mechanism is reset so the brake cam activating the brake shoes is returned to its minimal expandable position, known as the beginning of the brake adjustment cycle. To install the brake lining wear indicator gauge 8 on a brake camshaft that has splines remove the snap ring and washer then install the brake lining wear indicator gauge 8 over the splined end of the brake camshaft 12 making sure the splined grooves are mated, using the timing marks 16 on the end of the brake camshaft 12 and the timing marks 10 on the brake lining wear indicator gauge are in line and properly timed to each other. The alignment line 18 on both the slack adjuster 14 and it's cover 15 should be in alignment with the calibration mark F on the dial gauge as shown in FIG. 1 of the drawings.

When adjustments are made to compensate for brake lining wear that takes place inside the brake drum compartment the calibration mark F on the face of the brake lining wear indicator gauge 8 moves away from the alignment mark 18 on the slack adjuster 14. The axial center line drawn between the center of the clevis pin hole and the brake camshaft centering hole discloses the condition of the brake lining at the position where the axial line intersects the calibration marks on the face of the dial gauge.

Because of variations of slack adjusting levers and variations of brake camshaft sizes and configurations the center of the brake lining wear indicator gauge is altered to fit all of these various configurations. Long brake cam shafts with numerous splines takes a brake lining wear indicator gauge with a splined center hole, while short brake camshafts using a capscrew to fasten the slack adjusting lever retaining washer on the end of the brake camshaft instead of a snap ring take a brake lining wear indicator gauge 8a with a small hole in the center using the existing spacer washer 28 to allow a capscrew to fit through the hole in the center of the gauge and the spacer to reach and connect the gauge with the short brake camshaft. Short brake camshafts that are axially recessed inside the hub of slack adjusting levers as shown in FIG. 3 take a brake lining wear indicator gauge 8b that has a cupped center as shown in FIG. 3.

FIG. 1 in the attached drawings shows the brake lining wear indicator gauge 8 mounted on the spline end of the brake camshaft 12 with the timing marks 16 on the end of camshaft 12 and the timing marks 10 on the brake lining wear indicator gauge respectively timed showing the position of the alignment marks 18 on both the slack adjuster 14 and the cover plate 15 relative to the calibration mark F on the wear indicator gauge signifying the brake linings inside the brake drum compartment are new and full bodied. FIG. 2 in the attached drawings shows a fragmented frontal view of a slack adjusting lever 14a used in brake adjusting systems that use short camshafts. FIG. 3 in the drawings shows a side view of the slack adjusting lever 14a using a short brake camshaft 12a having a threaded hole on the splined end of the shaft. From the side view in FIG. 3 another aspect of the brake lining wear indicator gauge numbered 8b is shown having the center of the gauge cupped with a small center hole instead of a splined center, the small hole in the cupped center is to allow a capscrew 25 to attach and connect the gauge to the brake camshaft. In yet another aspect of the brake lining wear indicator gauge numbered 8a the flat gauge uses the same existing spacer washer 28 that some short brake camshafts have been using with a spacer washer used as a retaining washer, this aspect of a flat brake lining wear indicator gauge with a small hole in the middle instead of a splined center is used to replace the cupped aspect of the brake lining wear indicator gauge. The spacer washer 28 that some brake camshafts use varies in thicknesses to accommodated the different lengths of brake camshafts.

Figure 5:
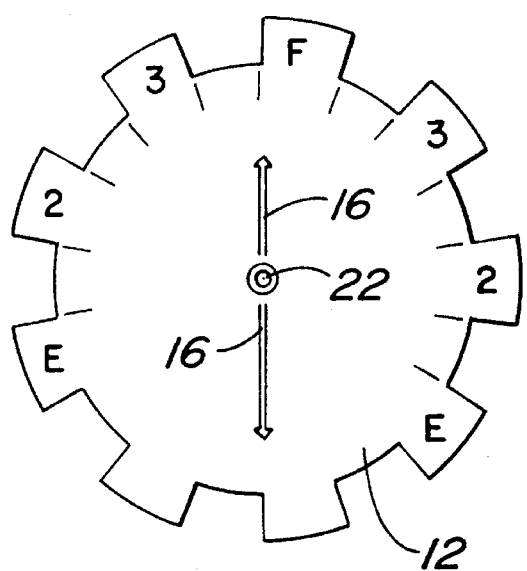
FIG. 5 is the end of a brake camshaft having indications similar to those on the brake lining wear indictor.
Figure 6:
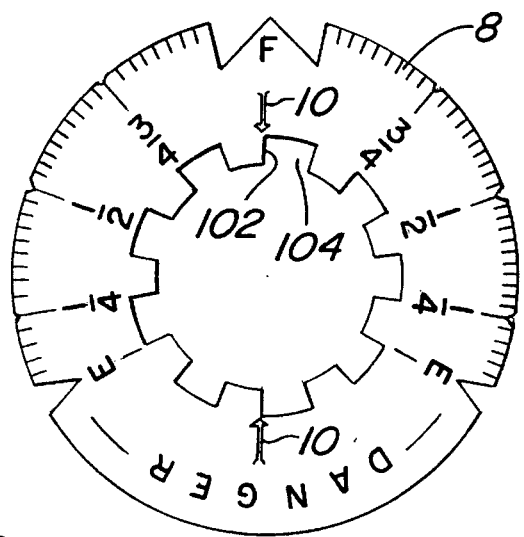
FIG. 6a is a brake lining wear indicator gauge to be used on a splined end brake camshaft.
FIG. 6b is a brake lining wear indicator gauge to be used on a short brake camshaft and an existing washer.
FIG. 6c is a brake lining wear indicator gauge having a cupped central portion to be used on a short brake camshaft without an existing washer.
Figure 6A:
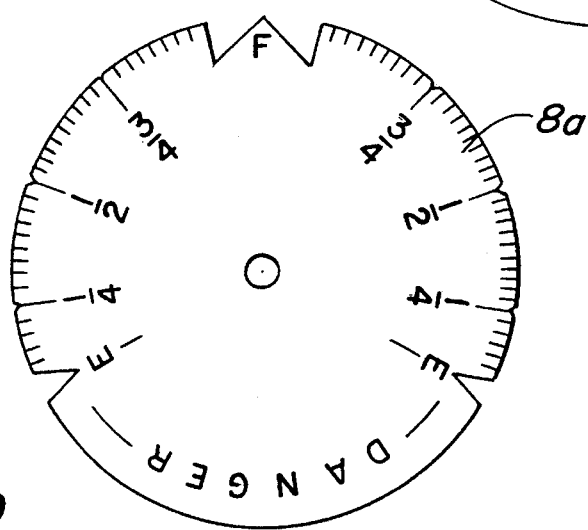

FIG. 4: in the attached drawings shows a side view of the brake lining wear indicator gauge 8 mounted on the splined end of the long type brake camshaft 12. The brake lining wear indicator gauge 8 is positioned between the slack adjuster 14 and the snap ring 24 replacing the conventional spacer washer. The number 30 in FIG. 4 points to a cross section of the brake camshaft support bracket. FIG. 5: in the attached drawings shows the splined end of a brake camshaft 12 with the timing mark 16 and the calibration marks, numbers and letters on the end of the camshaft to be used as a brake lining wear indicator register where no provision is made to mount the brake lining wear indicator gauge on the end of the brake camshaft. The calibration marks on the end of brake camshafts is a miniature aspect of the brake lining wear indicator gauge register. In FIG. 5: is shown the machined centering hole 22 used to form the axial measuring line that bisects the calibrations on the face of the brake lining dial gauge. FIG. 6: in the attached drawings shows the embodiment of the brake lining wear indicator gauge 8 showing a frontal view of the gauge with internal grooves designed to fit the splined end of brake camshafts. FIG. 6a of the drawings shows aspect 8a another aspect and embodiment of the brake lining wear indicator gauge showing a frontal view of the dial gauge with a single small center hole able to accommodate a capscrew 25 to attach the gauge to the end of short cam shafts 12a using the already existing spacer washer 28 as shown in FIG. 3 of the drawings.

Figure 6B:
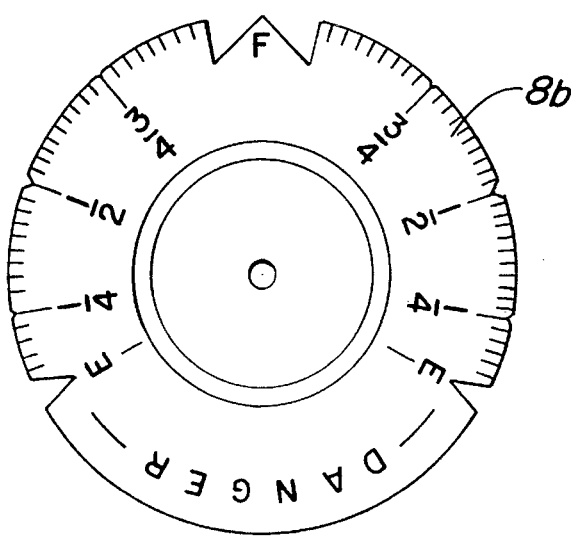

FIG. 6b of the drawings shows aspect 8b another aspect and embodiment of the brake lining wear indicator gauge showing a frontal view of the dial gauge with a cupped center portion and a small hole in the center of the cupped center to accommodate a capscrew 25 to attach the gauge to the end of the short brake camshaft 12a that have a threaded hole in the splined end of the brake camshaft.

Figure 7:
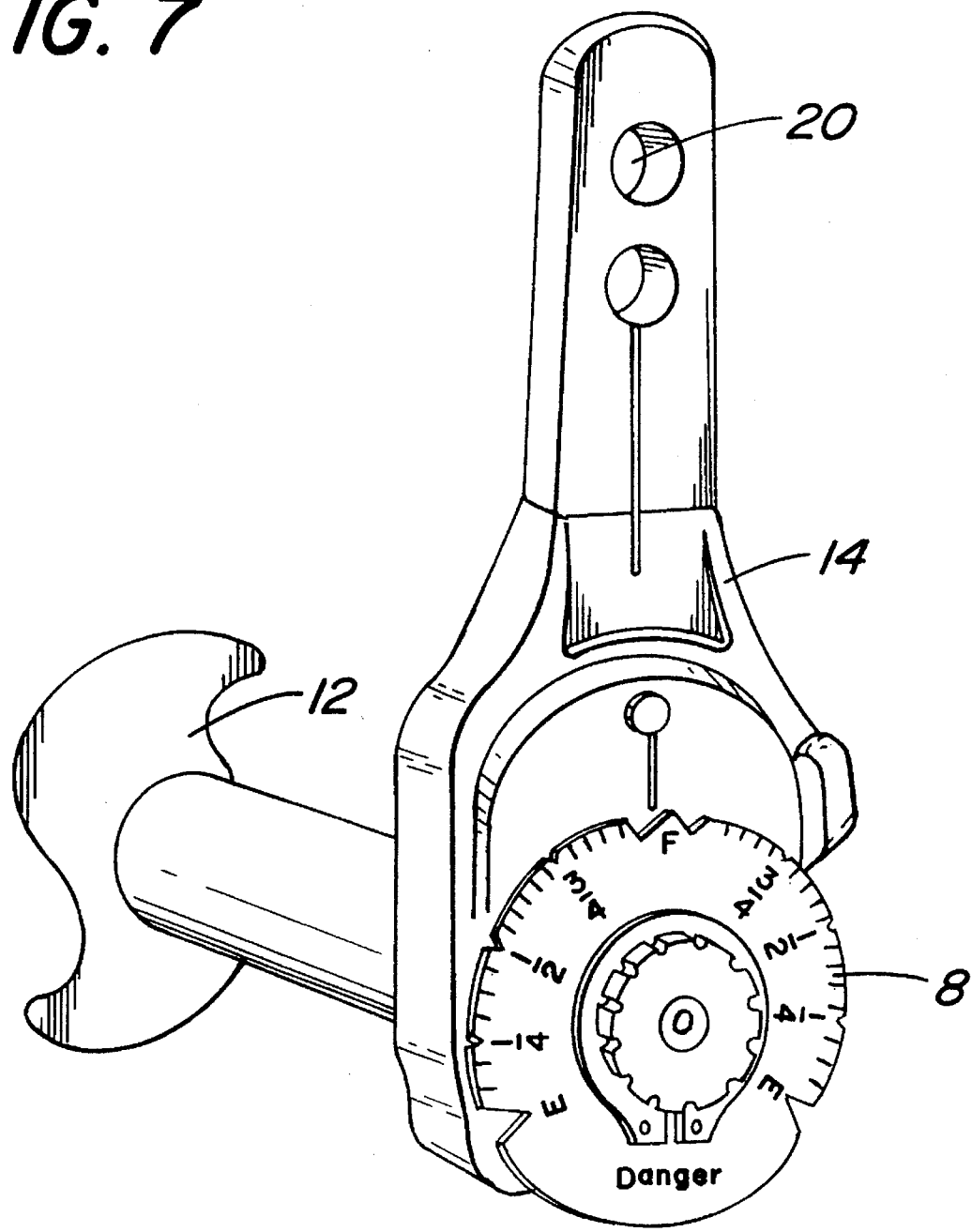
FIG. 7 is an isometric view of the brake lining wear indicator gauge installed on a splined brake camshaft.

FIG. 7 in the drawings shows a scanned image of the brake lining wear indicator gauge installed on the splined end of an S type rotating brake camshaft using a manual type slack adjusting lever. Note that the position of the F calibration mark on the face of the dial gauge is perpendicular and axially in line with the hole 20 used by the clevis pin and the centering hole 22 in the splined end of the brake camshaft.

The inside diameter of the center opening of the brake lining wear indicator gauge 8 is relative to the shape and outside diameter of the brake camshaft 12. The number of grooves machined in the perimeter of the hole in the center of the brake lining wear indicator gauge 8 is relative to the number of grooves machined on the splined end of the brake camshaft 12. Example: A brake camshaft with 28 splines requires a brake lining wear indicator gauge with a 28 matching spline center hole, while a brake camshaft with ten splines requires a brake lining wear indicator gauge with ten matching splines in the center hole.

The brake lining wear indicator gauge is calibrated on both sides for reversing purposes and for the purpose of installing the gauge on the left or the right side of the vehicle's braking system using the type of brake camshafts that have splines protruding past the slack adjusting levers as shown in FIG. 4 of the drawings.

I claim:

1. A brake lining wear indicator gauge to be coupled to a brake camshaft of a brake adjusting mechanism wherein the camshaft has an end and is coupled to a slack adjustment lever having a cover plate, the camshaft end, the slack adjustment lever and the cover plate having respective alignment reference points, said gauge comprising a first side and a second side sharing a common outer periphery and a common central aperture for coupling said gauge to the camshaft end, said gauge indicating brake lining wear to a person without the use of a separate cooperating plate once said gauge is coupled to the camshaft end, said outer periphery being circular and having two adjacent notches forming a start-cycle pointer therein to be aligned with one of the respective alignment reference points at the start of the brake lining wear cycle, said outer periphery also having a third notch and a fourth notch therein, said first side having calibrations indicated by numerals and lines adjacent said outer periphery between said start-cycle pointer and said third notch and between said start-cycle pointer and said fourth notch, said numerals appearing in descending order from said start-cycle pointer to said third notch and from said start-cycle pointer to said fourth notch, said numerals and lines corresponding to the amount of brake lining wear.

2. The brake lining wear indicator gauge of claim 1 wherein the end of the camshaft is splined and wherein said common central aperture has a periphery comprising grooves that correspond to the splined end to secure said gauge to the splined end, each groove having two sidewalls.

3. The brake lining wear indicator gauge of claim 1 wherein the brake adjusting mechanism is right-handed and said gauge is coupled to the brake camshaft, said third notch providing a tactile indication of the end of the brake lining wear cycle.

4. The brake lining wear indicator gauge of claim 1 wherein the brake adjusting mechanism is left-handed and said gauge is coupled to the brake camshaft, said fourth notch providing a tactile indication of the end of the brake lining wear cycle.

5. The brake lining wear indicator gauge of claim 2 wherein said gauge replaces a conventional spacer washer and said gauge is locked to the splined end by a snap ring.

6. The brake lining wear indicator gauge of claim 1 wherein the brake camshaft is a short brake camshaft and wherein said common central aperture of said gauge comprises a circular hole to allow passage of a capscrew, said capscrew securing said gauge against a spacer that abuts the end of the short brake camshaft.

7. The brake lining wear indicator of claim 1 wherein the brake camshaft is a short brake camshaft and wherein said common central aperture of said gauge comprises a circular hole to allow passage of a capscrew, said gauge also having a cupped central portion with said hole at the center of said cupped central portion, said capscrew securing said gauge against the end of the short brake camshaft.

8. The brake lining wear indicator of claim 2 wherein said common central portion has a top groove and wherein said start-cycle pointer is aligned with one of said two sidewalls of said top groove, said second side also having calibrations indicated by numerals and lines adjacent said outer periphery between said start-cycle pointer and said third notch and between said start-cycle pointer and said fourth notch, said alignment with said one of said two sidewalls of said top groove allowing said gauge to be secured to the splined end with said second side visible with said calibrations being oriented to compensate for installation of new oversized brake linings.

9. The brake lining wear indicator gauge of claim 1 wherein said second side also has calibrations indicated by numerals and lines adjacent said outer periphery between said start-cycle pointer and said third notch and between said start-cycle pointer and said fourth notch.

\* \* \* \* \*